US010116387B2

(12) United States Patent
Takita et al.

(10) Patent No.: US 10,116,387 B2
(45) Date of Patent: Oct. 30, 2018

(54) CONTROL DEVICE, OPTICAL TRANSMISSION SYSTEM, AND METHOD FOR CONTROLLING OPTICAL TRANSMISSION SYSTEM

(71) Applicant: FUJITSU LIMITED, Kawasaki-shi, Kanagawa (JP)

(72) Inventors: Yutaka Takita, Kawasaki (JP); Shigeru Ishii, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/612,411

(22) Filed: Jun. 2, 2017

(65) Prior Publication Data

US 2017/0353239 A1 Dec. 7, 2017

(30) Foreign Application Priority Data

Jun. 7, 2016 (JP) .................. 2016-113246

(51) Int. Cl.
*H04B 10/08* (2006.01)
*H04B 10/079* (2013.01)
*H04J 14/02* (2006.01)

(52) U.S. Cl.
CPC . *H04B 10/07957* (2013.01); *H04B 10/07953* (2013.01); *H04J 14/0212* (2013.01)

(58) Field of Classification Search
CPC .................. H04J 14/02; H04J 14/0212; H04B 10/07957; H04B 10/07953; H04B 10/0795; H04B 10/0793; H04B 10/0775; H04B 10/07955; H04Q 11/0062; H04Q 11/0066; H04Q 11/0005
USPC ........ 398/33, 34, 37, 38, 79, 25, 26, 27, 58, 398/45, 48, 49, 158, 159
See application file for complete search history.

(56) References Cited

U.S. PATENT DOCUMENTS 7,190,902 B2 * 3/2007 Solheim ............. H04B 10/0793
398/16
7,941,047 B2 * 5/2011 Zhou .................. H04Q 11/0062
398/15

FOREIGN PATENT DOCUMENTS

JP 2014-508429 4/2014
WO WO 2012/117564 A1 9/2012

* cited by examiner

*Primary Examiner* — Hanh Phan
(74) *Attorney, Agent, or Firm* — Staas & Halsey LLP

(57) ABSTRACT

There is provided a control device for controlling a first transmission device and a second transmission device, the control device including a memory, and a processor coupled to the memory and the processor configured to set a first wavelength path between the first transmission device and the second transmission device, select a monitoring wavelength path from established wavelength paths allocated on a transmission line between the first transmission device and the second transmission device, monitor a signal quality of the monitoring wavelength path, and increase power of the first wavelength path, based on the signal quality of the monitoring wavelength path.

20 Claims, 19 Drawing Sheets

FIG.3

| PATH NUMBER | WAVELENGTH | PATH |
|---|---|---|
| 1 | 3 | A, B, D, E |
| 2 | 5 | A, B, C |
| 3 | 5 | D, E |

FIG.9

| | NEW WAVELENGTH PATH POWER (dBm/ch) | MONITORING TARGET WAVELENGTH PATH | | | NEW WAVELENGTH PATH |
|---|---|---|---|---|---|
| | | 1 | 2 | 3 | |
| | -1 | | | | |
| MINIMUM ALLOWABLE PATH POWER → | -3 | OK | OK | OK | OK |
| | -5 | OK | OK | OK | N/A |
| | -7 | OK | OK | OK | N/A |
| MINIMUM PATH POWER → | -10 | OK | OK | OK | N/A |

FIG.18A
FIG.18B
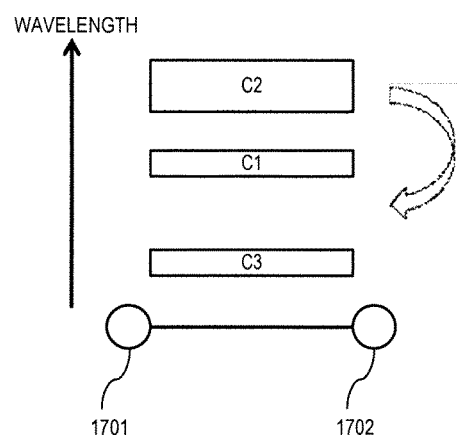
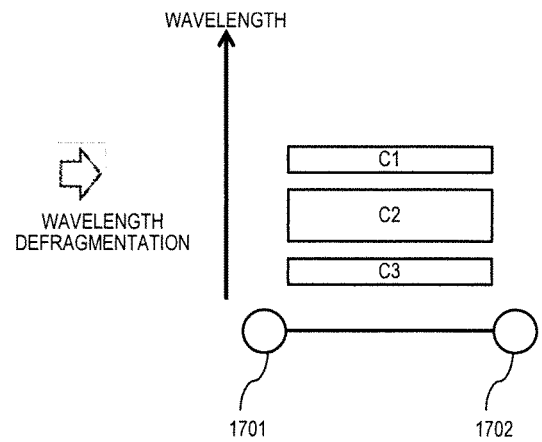
WAVELENGTH DEFRAGMENTATION

CONTROL DEVICE, OPTICAL TRANSMISSION SYSTEM, AND METHOD FOR CONTROLLING OPTICAL TRANSMISSION SYSTEM

CROSS-REFERENCE TO RELATED APPLICATION

This application is based upon and claims the benefit of priority of the prior Japanese Patent Application No. 2016-113246, filed on Jun. 7, 2016, the entire contents of which are incorporated herein by reference.

FIELD

The embodiments discussed herein are related to a control device, an optical transmission system, and a method for controlling the optical transmission system.

BACKGROUND

A fixed grid optical network having fixed center wavelength and slot width that is spacing between wavelengths has been conventionally used as an optical network. In addition, equipment of a single vendor has been often used to construct the optical network. Therefore, the situations of the network may be easily grasped, and a sufficient margin on a wavelength axis may be secured between adjacent wavelength paths. Accordingly, when a new wavelength path is set in a conventional optical network, it is sufficient to set the new wavelength path without considering an effect on an established wavelength path and perform conduction (transmission verification).

Meanwhile, instead of the conventional fixed grid optical network, a flexible grid optical network (elastic optical network) aiming at an effective utilization of wavelength resources by flexibly selecting a center wavelength and a slot width is being adopted. In the flexible grid optical network, it is expected that a combination of vendor equipment is used to reduce network costs (capital expenditure (CAPEX)) or different modulation schemes are used for different wavelength paths. For this reason, due to the mixture of equipment of different vendors, it becomes difficult to grasp the situations of the network, or a wavelength path is set with a minimum transmission penalty margin.

In addition, in order to avoid a situation where a wavelength path is used in a so-called worm-eaten manner by the introduction of software defined network (SDN) repeating dynamically setting and releasing a wavelength path, there is an increasing need of wavelength defragmentation.

Related techniques are disclosed in, for example, Japanese Laid-Open Patent Publication No. 2014-508429.

SUMMARY

According to an aspect of the invention, a control device for controlling a first transmission device and a second transmission device, the control device includes a memory, and a processor coupled to the memory and the processor configured to set a first wavelength path between the first transmission device and the second transmission device, select a monitoring wavelength path from established wavelength paths allocated on a transmission line between the first transmission device and the second transmission device, monitor a signal quality of the monitoring wavelength path, and increase power of the first wavelength path, based on the signal quality of the monitoring wavelength path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a view illustrating an example of data stored in a wavelength path database of a control device of the optical transmission system according to the first embodiment;

FIG. 9 is a view illustrating gradually (stepwise) increasing the power of a new wavelength path when setting the new wavelength path;

FIGS. 18A and 18B are views illustrating an example of wavelength defragmentation.

DESCRIPTION OF EMBODIMENTS

Figure 1:
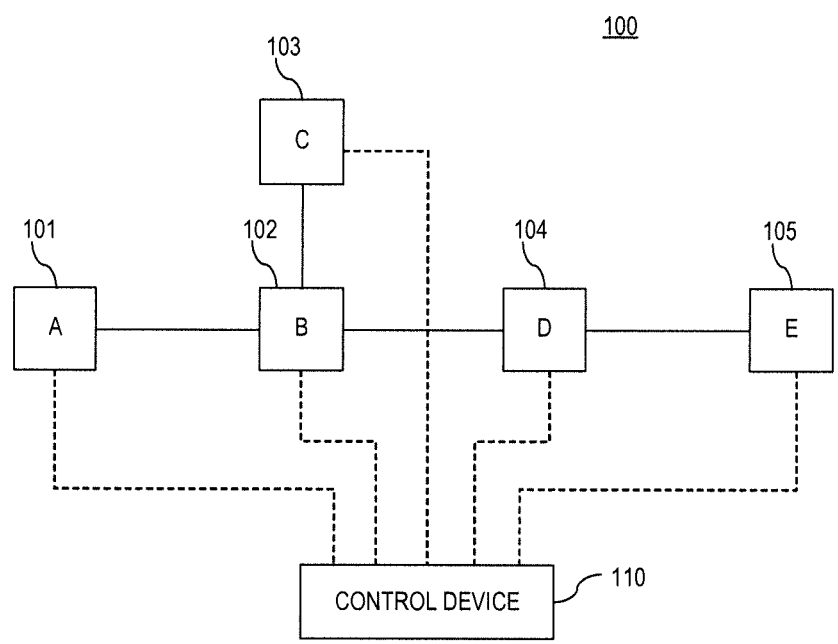
FIG. 1 is a view illustrating the overall configuration of an optical transmission system according to a first embodiment.

Due to the characteristics of a flexible grid optical network, when an attempt to newly set a wavelength path is made, it is expected that the possibility of adversely affecting the existing wavelength path will increase as compared to a case where the fixed grid optical network is used. For example, it is difficult to detect that a transmission margin of an adjacent wavelength path is deteriorated below a predetermined value, which may result in impossibility of transmission of a wavelength path at an unexpected timing. However, it is difficult to distinguish the cause of such transmission impossibility from other failure factors (e.g., a transponder failure and a reception failure).

Hereinafter, embodiments of a technique capable of setting a new wavelength path by reducing an effect on the transmission characteristics of an established wavelength path will be described with reference to the drawings. However, the following embodiments are merely examples, and various modifications and techniques that are not explicitly described are not intended to be excluded from the present disclosure. In the drawings used in the following embodiments, the same or similar elements and parts are denoted by the same reference numerals unless otherwise specified.

First Embodiment

FIG. 1 is a view illustrating the overall configuration of an optical transmission system 100 according to a first embodiment. The optical transmission system 100 includes nodes A 101, B 102, C 103, D 104, and E 105 and a control device 110.

Each of the nodes A 101, B 102, C 103, D 104 and E 105 includes an optical transmission repeater (transmission device). Referring to FIG. 1, the node A 101 and the node B 102, the node B 102 and the node C 103, the node B 102 and the node D 104, and the node D 104 and the node E 105 are respectively interconnected by an optical transmission line. Therefore, for example, a signal input to a transponder connected to the optical transmission repeater of the node A 101 is output from a transponder connected to the optical transmission repeater of the node B 102. At this time, the signal input to the node A 101 is converted into an optical signal which is then transmitted to the optical transmission repeater of the node B 102 via the optical transmission line.

Further, for example, in order to transmit a signal from the node A 101 to the node D 104, an optical signal is transmitted via the node B 102. In other words, first, an optical signal is transmitted from the node A 101 to the node B 102 via the optical transmission line. Thereafter, certain amplification and path selection are performed at the node B 102, and an optical signal is transmitted from the node B 102 to the node D 104 via the optical transmission line. At this time, the center wavelength of the optical signal transmitted from the node A 101 to the node B 102 and the center wavelength of the optical signal transmitted from the node B 102 to the node D 104 become equal to each other. The fact that the center wavelengths of optical signals transmitted between the nodes become equal to each other is equally applied to a case where an optical signal passes through a plurality of nodes. For example, when an optical signal is transmitted from the node A 101 to the node E 105 via the node B 102 and the node D 104, the center wavelengths of optical signals transmitted between the nodes are also equal to each other.

Therefore, a wavelength path may be identified with a group consisting of a node serving as a start point, a node serving as a relay point, if any, and a node serving as an end point, together with the center wavelength of an optical signal (herein after, referred to as a first identification). Further, the wavelength path may be identified to further include a slot width (herein after, referred to as a second identification). In other words, the wavelength path according to the second identification corresponds to a group consisting of a node serving as a start point, a node serving as a passing point, if any, a node serving as an end point, the center wavelength of an optical signal, and a slot width. The following description will be given with the first identification, but the second identification may be used and other identification may also be used if necessary.

In addition, an optical transmission path between two adjacent nodes is referred to as a "span." For example, a wavelength path from the node A 101, through the node B 102, to the node D 104 has two spans. In other words, this wavelength path has a span from the node A 101 to the node B 102 and a span from the node B 102 to the node D 104.

The control device 110 is connected to each node and is capable of communicating with each node. The control device 110 controls the optical transmission repeater of each node. The control device 110 controls the transmission power (sometimes referred to as a path power or simply a power) of an optical signal of each wavelength path and monitors the signal quality of the optical signal of each wavelength path. The signal quality may be measured by a bit error rate (BER), an optical signal-to-noise ratio (OSNR) or the like. In the following description, for the purpose of simplicity of explanation, the signal quality is represented by the amount of noise obtained by measurement of BER.

Figure 2:
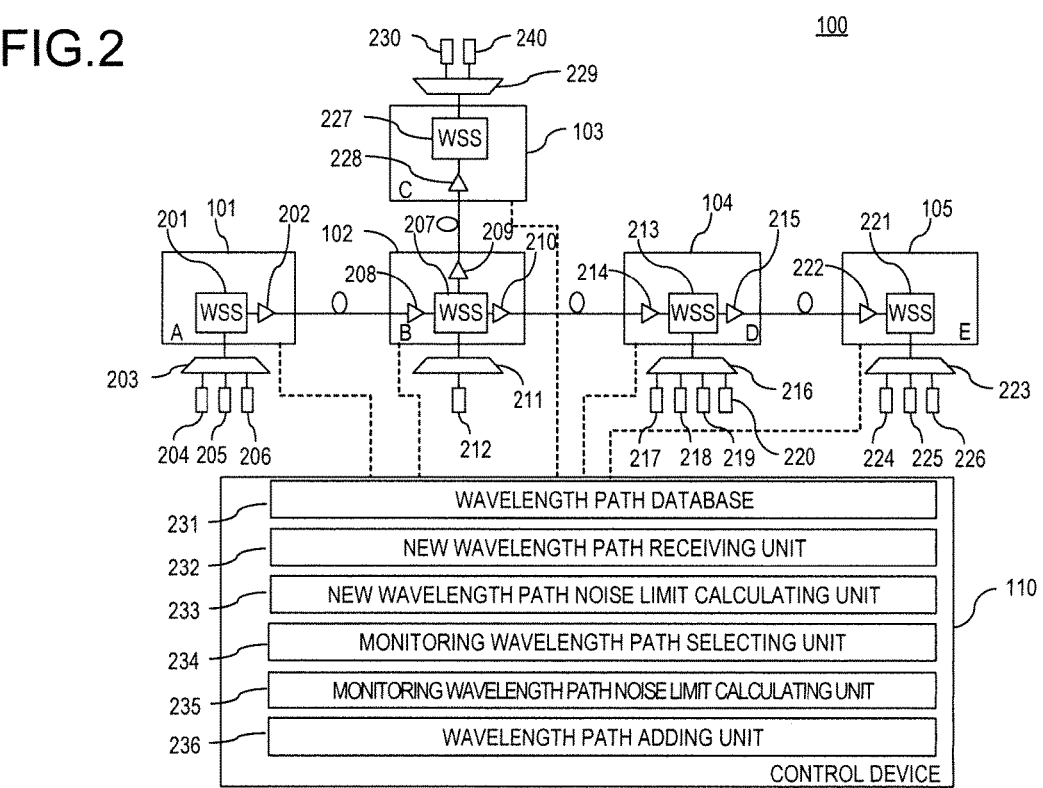
FIG. 2 is a functional block diagram of the optical transmission system according to the first embodiment.

FIG. 2 is a functional block diagram of the optical transmission system 100 according to the first embodiment.

The node A 101 has a wavelength section switch (WSS) 201 and a post-amplifier 202. A multiplexer 203 to which transponders 204 to 206 are connected is connected to the WSS 201. The node A 101 is a node which serves as a start point of a wavelength path.

The node B 102 is a node capable of transmitting an optical signal transmitted from the node A 101 to the node C 103 and the node D 104. The node B 102 has a pre-amplifier 208 which amplifies the optical signal from the node A 101, and an output optical signal from the pre-amplifier 208 is input to a WSS 207. A multiplexer/de-multiplexer 211 to which a transponder 212 for adding/dropping an optical signal is connected is connected to the WSS 207. In addition, post-amplifiers 209 and 210 which transmit an optical signal to the node C 103 and the node D 104 are connected to the WSS 207. The node B 102 is a node which may serve as either a start point, an end point, or a relay point of a wavelength path.

The node C 103 has a WSS 227 and a pre-amplifier 228 which is connected to the WSS 227 and amplifies an optical signal transmitted from the node B 102. The WSS 227 is connected to a de-multiplexer 229 to which transponders 230 and 240 are connected. The node C 103 is a node which serves as an end point of a wavelength path.

The node D 104 is a node capable of transmitting the optical signal transmitted from the node B 102 to the node E 105. The node D 104 has a pre-amplifier 214 which amplifies the optical signal from the node B 102. An output optical signal from the pre-amplifier 214 is input to a WSS 213. A multiplexer/de-multiplexer 216 to which transponders 217 to 220 for adding/dropping an optical signal are connected is connected to the WSS 213. Further, a post-amplifier 215 is connected to the WSS 213 in order to transmit an optical signal to the node E 105. The node D 104 is a node which may serve as either a start point, an end point, or a relay point of a wavelength path.

The node E 105 has a WSS 221 and a pre-amplifier 222 which is connected to the WSS 221 and amplifies an optical signal transmitted from the node D 104. The WSS 221 is connected to a de-multiplexer 223 to which transponders 224 to 226 are connected. The node E 105 is a node which serves as an end point of a wavelength path.

The number of nodes A 101 to the node E 105 is not limited to five and is arbitrary, and there may be node connection in various topologies. Although it assumed in FIGS. 1 and 2 that the transmission of an optical signal between nodes is unidirectional, it may be bidirectional.

The control device 110 includes a wavelength path database 231, a new wavelength path receiving unit 232, a new wavelength path noise limit calculating unit 233, a monitoring wavelength path selecting unit 234, a monitoring wavelength path noise limit calculating unit 235, and a wavelength path adding unit 236. These functions are implemented by a central processing unit (CPU) (not illustrating) executing an operating system (OS) and programs stored in a memory (not illustrating).

The wavelength path database 231 stores information on wavelength paths (established wavelength paths) currently set in the optical transmission system 100. The information on the wavelength paths includes the center wavelength of an optical signal, identification information of a node at a start point, identification information of a node at a relay point, if any, and identification information of a node at an end point.

FIG. 3 is a view illustrating an example of information stored in the wavelength path database 231. "Path number" is the name of a column that stores identification information for uniquely identifying a wavelength path, and "wavelength" is the name of a column that stores identification information of the center wavelength of an optical signal of the wavelength path. "Path" is the name of a column that stores identification information of a node at a start point of the wavelength path, identification information of a node at relay point, if any, and identification information of a node at an end point.

For example, for a wavelength path having identification information "1" as the path number, identification information of the center wavelength of an optical signal is "3," a start point is the node A 101, relay points are the node B 102 and the node D 104, an end point is the node E 105, and a length is 3 spans. Instead of the identification information of the center wavelength of the optical signal, a value itself of the center wavelength of the optical signal may be used.

Similarly, for a wavelength path having identification information "2" as the path number, identification information of the center wavelength of an optical signal is "5," a stat point is the node A 101, a relay point is the node B 102, an end point is the node C 103, and a length is 2 spans.

Similarly, for a wavelength path having identification information "3" as the path number, identification information of the center wavelength of an optical signal is "5," a start point is the node D 104, an end point is the node E 105, and a length is one span.

Hereinafter, the wavelength path having the identification information "1" as the path number is referred to as a wavelength path 1. Similarly, the wavelength path having the identification information "2" is referred to as a wavelength path 2, and the wavelength path having the identification information "3" is referred to as wavelength path 3.

Figure 4:
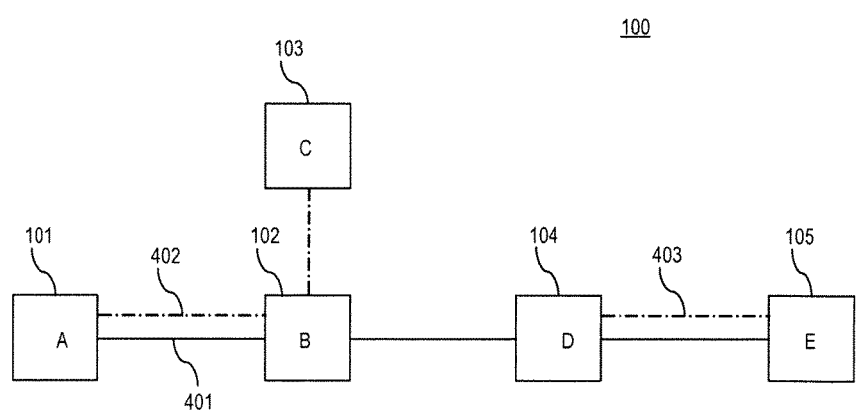
FIG. 4 is a view illustrating a wavelength path illustrated in FIG. 3.

FIG. 4 is a view illustrating the wavelength paths illustrated in FIG. 3. In FIG. 4, a solid line 401 represents the wavelength path 1. Similarly, a dashed line 402 represents the wavelength path 2, and a dashed line 403 represents the wavelength path 3.

In the following description, the control device 110 will be described with an example in which the wavelength paths 1 to 3 are already set and a new wavelength path having identification information "4" of the center wavelength of an optical signal is set. For the wavelength path having the identification information "4" of the center wavelength of the optical signal, a start point is the node A 101, relay points are the node B 102 and the node D 104, and an end point is the node E 105. It is here assumed that the center wavelength of the optical signal having the identification information "4" lies between the center wavelength of the optical signal having the identification information "3," and the center wavelength of the optical signal having the identification information "5." In other words, it is assumed that the order of magnitude of the center wavelength of the optical signal is determined according to the order of magnitude of the value of the identification information of the center wavelength of the optical signal.

Referring back to FIG. 2, the new wavelength path receiving unit 232 receives information on a wavelength path to be newly set. For example, the new wavelength path receiving unit 232 receives information indicating a wavelength path input to an input/output device such as a display and a keyboard. Alternatively, the new wavelength path receiving unit 232 may receive the information from a file describing the information indicating the wavelength path.

Figure 5:
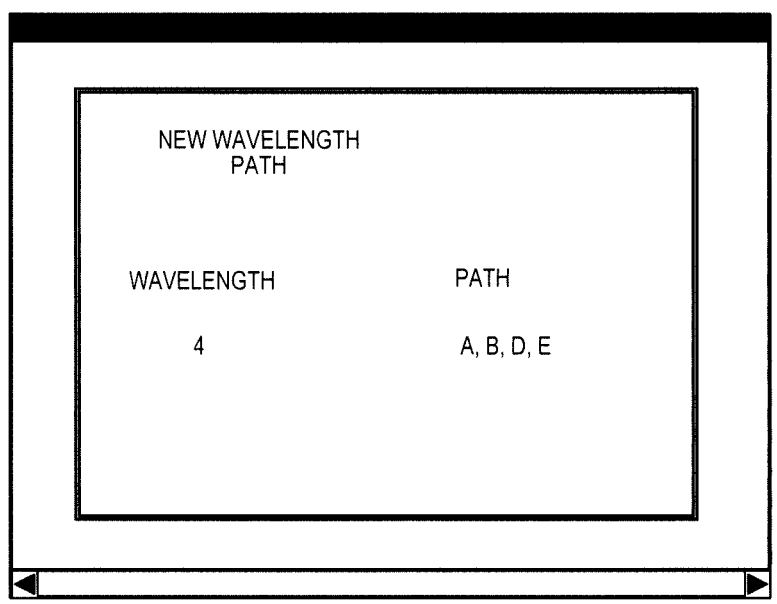
FIG. 5 is a view illustrating an example of screen display for adding a new wavelength path in the first embodiment.

FIG. 5 illustrates an example of a state in which the information on the wavelength path to be newly set is received by the new wavelength path receiving unit 232 and is displayed on a screen or the like. As illustrated in this example, the identification information of the center wavelength of an optical signal is "4," and as information indicating a path, a start point is A, relay points are B and D and an end point is E.

Figure 6:
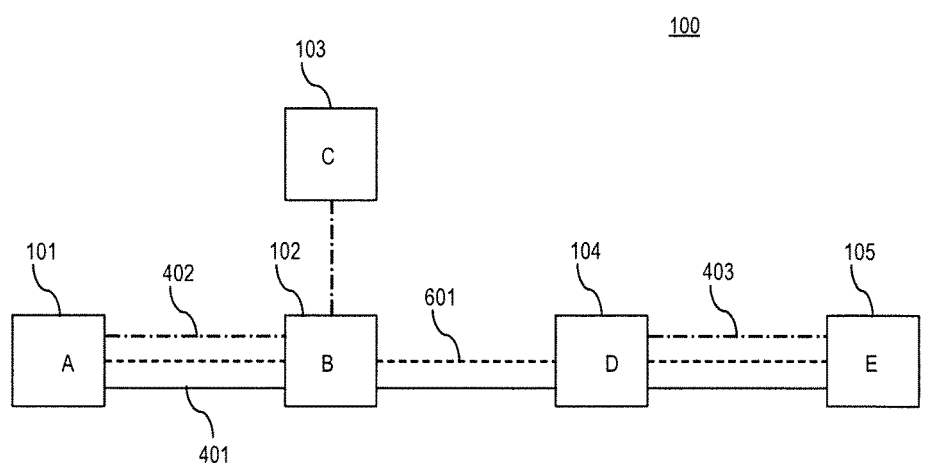
FIG. 6 is a view illustrating an example of a wavelength path after a new wavelength path is added from the example illustrated in FIG. 4.

FIG. 6 is a view specifically illustrating a wavelength path in a case where the state of FIG. 4 in which the wavelength paths 1 to 3 have already been set is changed to the state of FIG. 5 in which the wavelength path with the information is newly set. In FIG. 6, the newly set wavelength path is indicated by a dotted line 601. As described above, the center wavelength of the optical signal having the identification information "4" corresponding to the dotted line 601 lies between the center wavelength of the optical signal having the identification information "3," and the center wavelength of the optical signal having the identification information "5." Therefore, as illustrated in FIG. 6, the dotted line 601 is placed between the solid line 401 and the dashed line 402 in a span between the node A 101 and the node B 102, and the dotted line 601 is placed between the solid line 40 and the dashed line 403 in a span between the node D 104 and the node E 105.

Referring back to FIG. 2 again, the new wavelength path noise limit calculating unit 233 calculates the noise limit amount of a wavelength path newly set (hereinafter referred to as a "wavelength path N") based on the information received by the new wavelength path receiving unit 232. When another wavelength path is newly set after the wavelength path N is set, the new wavelength path noise limit calculating unit 233 calculates the noise amount (noise limit amount) of the wavelength path N that does not make transmission of the wavelength path N impossible even when the another wavelength path affects the wavelength path N, that is, the another wavelength path being newly set affects the noise amount of the wavelength path N.

The noise limit amount calculated by the new wavelength path noise limit calculating unit 233 indicates the lower limit value of communication quality. Therefore, the new wavelength path noise limit calculating unit 233 may be referred to as a new wavelength path lower limit value calculating unit.

As a case where another wavelength path affects the wavelength path N, the center wavelengths of optical signals of the another wavelength path and the wavelength path N may be adjacent to each other. Another case where the another wavelength path affects the wavelength path N is nonlinear effects such as mutual phase modulation, intra-channel four-wave mixing, stimulated Raman scattering and the like. In the following description, for the purpose of simplicity of explanation, the case where the center wavelengths of optical signals of the another wavelength path and the wavelength path N are adjacent to each other will be described, but a case with a nonlinear effect may also be explained in a similar manner.

In a case where there is a possibility that another wavelength path is set such that the center wavelength of an optical signal of the another wavelength path is adjacent to the center wavelength of the optical signal of the wavelength path N after setting the wavelength path N, it is necessary to set the wavelength path N in consideration of an effect of the another wavelength path on the wavelength path N. For example, assume that, after setting the wavelength path N, a wavelength path whose optical signal has a center wavelength adjacent to the center wavelength of the optical signal of the wavelength path N is newly set to affect the wavelength path N and the increase in amount of noise of the wavelength path N is "q." Then, it is necessary to make the amount of noise of the wavelength path N after setting the wavelength path N less than an amount obtained by subtracting q from the maximum amount of noise at which optical transmission becomes possible (hereinafter, may be sometimes referred to as a noise amount limit (final value)).

Referring to FIGS. 3 to 6, after the wavelength path N illustrated in FIG. 5 is newly set in the state in which the wavelength path illustrated in FIG. 3 is set, when the center wavelength of an optical signal having the identification information "5" in the span between the node B 102 and the node D 104 is set, there is a possibility that the wavelength path N is affected. Therefore, when the wavelength path N is newly set, the noise limit amount becomes an amount obtained by subtracting q from the noise amount limit (final value).

As another formulation, a gap indicator $V_{N,s}$ at a span "s" on a wavelength path N refers to the number of wavelength paths causing deterioration of the communication quality of the wavelength path N by setting a new wavelength path after setting the wavelength path N. For example, $V_{N,A \to B}$ is 0, $V_{N,B \to D}$ is 1, and $V_{N,D \to E}$ is 0. Next, it is assumed that a gap indicator $V_N$ of the wavelength path N is the total sum of $V_{N,s}$ for the span s on the wavelength path N. For example, $V_N = V_{N,A \to B} + V_{N,B \to D} + V_{N,D \to E} = 0+1+0=1$. Therefore, when the wavelength path N is newly set, the noise limit amount is an amount obtained by subtracting $V_N \times q$ from the noise amount limit (final value).

It is assumed in the above description that the spans have the same value of q, but the value of q may be varied depending on a span distance. In this case, the noise limit amount in the case where the wavelength path N is newly set is equal to a value obtained by subtracting the total sum, which is calculated after multiplying $V_{N,A \to B}$, $V_{N,B \to D}$, and $V_{N,D \to E}$ by q, from the noise amount limit (final value).

Referring back to FIG. 2, the monitoring wavelength path selecting unit 234 selects an established wavelength path, which is likely to be affected by setting of the wavelength path N, as a monitoring target wavelength path (sometimes referred to as a "monitoring wavelength path"). In other words, a wavelength path M having a value of $V_M$ varied before and after setting of the wavelength path N is selected as the monitoring target wavelength path.

Referring to FIGS. 3 to 6, three wavelength paths, i.e., a wavelength path (wavelength path 1) indicated by the solid line 401, a wavelength path (wavelength path 2) indicated by the dashed line 402, and a wavelength path (wavelength path 3) indicated by the dashed line 403, are likely to be affected by the setting of the wavelength path N. Therefore, in the examples of FIGS. 3 to 6, the monitoring wavelength path selecting unit 234 selects the wavelength path 1 of the solid line 401, the wavelength path 2 of the dashed line 402, and the wavelength path 3 of the dashed line 403 as the monitoring target wavelength paths.

The monitoring wavelength path noise limit calculating unit 235 calculates the noise limit amount of the monitoring target wavelength path selected by the monitoring wavelength path selecting unit 234. The monitoring wavelength path noise limit calculating unit 235 calculates the amount of noise allowed immediately after setting the wavelength path N. In other words, the amount of noise in the monitoring wavelength path is calculated which does not exceed the noise amount limit (final value) even when another wavelength path is newly set after setting the wavelength path N.

The noise limit amount calculated by the monitoring wavelength path noise limit calculating unit 235 corresponds to the lower limit value of communication quality. Therefore, the monitoring wavelength path noise limit calculating unit 235 is sometimes referred to as a monitoring wavelength path lower limit value calculating unit.

Referring to FIGS. 3 to 6, after setting the wavelength path N of the dotted line 601, there is a possibility that a wavelength path having the center wavelength of an optical signal having the identification information "2" is set between A and B, between B and D, and between D and E. In this case, the wavelength path 1 (the solid line 401) is affected over 3 spans. Therefore, the noise limit amount of the wavelength path 1 needs to be a value obtained by subtracting 3×q from the noise amount limit (final value).

Similarly, after setting the wavelength path N of the dotted line 601, when a wavelength path having the center wavelength of an optical signal having identification information "6" is set in the span between A and B, the wavelength path 2 (the dashed line 402) is affected. Therefore, the noise limit amount of the wavelength path 2 needs to be a value obtained by subtracting q from the noise amount limit (final value).

Further, when a wavelength path having the center wavelength of an optical signal having identification numbers "4" and "6" is set in the span between B and C, the wavelength path 2 is affected. Therefore, the noise limit amount of the wavelength of the wavelength path 2 (the dashed line 402) needs to be a value obtained by subtracting 2×q from the noise amount limit (final value).

In conclusion, after setting the wavelength path N of the dotted line 601, the noise limit amount of the wavelength path 2 needs to be a value obtained by subtracting 3×q from the noise amount limit (final value).

Similarly, after setting the wavelength path N of the dotted line 601, when a wavelength path having the center wavelength of an optical signal having the identification information is "6" is set in the span between D and E, the wavelength path 3 (the dashed line 403) is affected. Therefore, the noise limit amount of the wavelength path 3 needs to be a value obtained by subtracting q from the noise amount limit (final value).

To summarize the above-described noise limit amounts, after setting the wavelength path N of the dotted line 601, it is necessary for the noise amount of the wavelength path N to be a value obtained by subtracting q from the noise amount limit (final value). It is necessary for the noise amount of the wavelength path 1 of the solid line 401 to be a value obtained by subtracting 3×q from the noise amount limit (final value). It is necessary for the noise amount of the wavelength path 2 of the dashed line 402 to be a value obtained by subtracting 3×q from the noise amount limit (final value). It is necessary for the noise amount of the wavelength path 3 of the dashed line 403 to be a value obtained by subtracting q from the noise amount limit (final value).

In other words, assuming that the monitoring wavelength path is M, the noise of M is a value obtained by subtracting $V_M \times q$ from the noise amount limit (final value).

Figure 7:
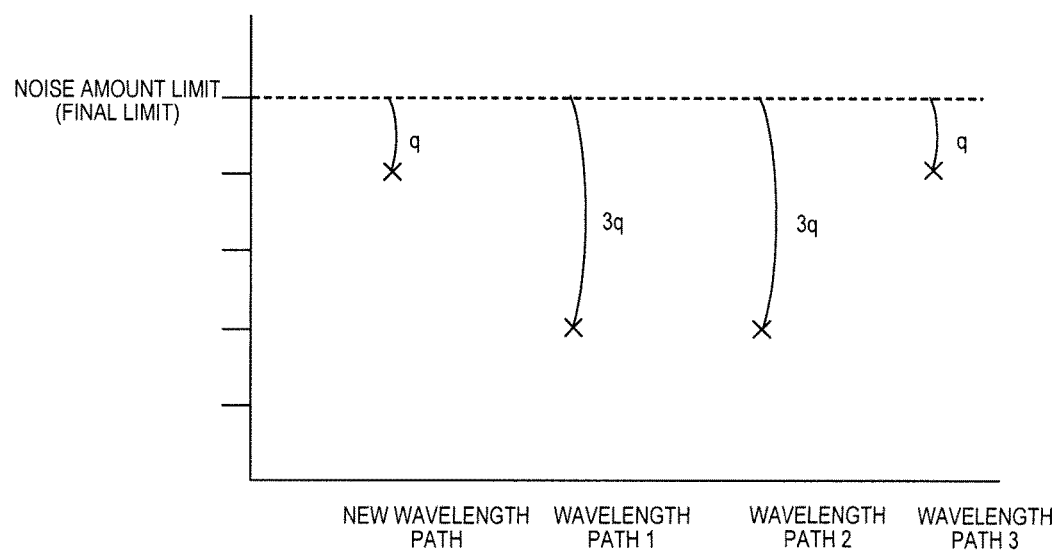
FIG. 7 is a view illustrating an example of a noise limit amount of each wavelength path after setting a new wavelength path.

FIG. 7 is a graph illustrating the noise limit amount of each wavelength path. It is illustrated in the graph that the noise amount limit of a new wavelength path N is equal to or smaller than a value obtained by subtracting q from the noise amount limit (final limit). Further, it is illustrated in the graph that the noise amount limit of a wavelength path (wavelength path 1) of the solid line 401 is a value obtained by subtracting 3×q from the noise amount limit (final limit). Further, it is illustrated in the graph that the noise amount limit of a wavelength path (wavelength path 2) of the dashed line 402 is a value obtained by subtracting 3×q from the noise amount limit (final limit). Further, it is illustrated in the graph that the noise amount limit of a wavelength path (wavelength path 3) of the dashed line 403 is a value obtained by subtracting q from the noise amount limit (final limit).

Referring back to FIG. 2 again, the wavelength path adding unit 236 adds and sets a wavelength path N based on the information received by the new wavelength path receiving unit 232. When setting the wavelength path N, the wavelength path adding unit 236 may set a target power, increase a path power one step at a time from the minimum value that may be outputted for all the optical transmission repeaters on the path, and set a path power of a new wavelength path N to the target power. The target power may be received at the same time when the new wavelength path receiving unit 232 receives the information on the newly set wavelength path. Alternatively, the target power may be determined depending on the number of spans of a wavelength path to be newly set. In this case, the target path power may be increased with the increase in the number of spans. Further, when target power is determined for each span at the time of designing the optical transmission system 100, the determined target power may be used.

Each time the path power is increased by one step, the wavelength path adding unit 236 may check whether or not the noise amount of the monitoring target wavelength path exceeds the noise limit amount. Additionally, each time the path power is increased by one step, the wavelength path adding unit 236 may check whether or not the noise amount of the wavelength path N exceeds the noise limit amount. In the following description, the wavelength path adding unit 236 will be described with the assumption that the amount of noise of the monitoring target wavelength path and the amount of noise of the wavelength path N are checked.

When setting the wavelength path N, the wavelength path adding unit 236 may check whether or not the noise amount of optical signals of the new wavelength path N and the monitoring target wavelength path received by the node C 103 and the node E 105 exceeds the noise limit amount. When it is checked that the noise amount exceeds the noise limit amount, the wavelength path adding unit 236 can interrupt the setting of the new wavelength path N. After the interruption, for example, it is possible to set the new wavelength path by lowering the target power or selecting another wavelength.

Figure 8A:
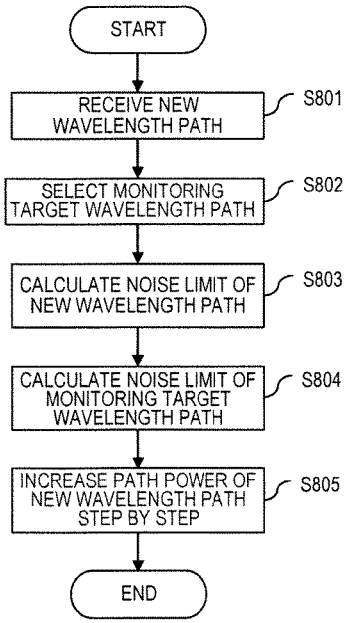
FIG. 8A is a flow chart of a process for setting a new wavelength path.

FIG. 8A illustrates a flow chart of a process performed by the control device 110 when newly setting a wavelength path N. In operation S801, information on a wavelength path to be newly set (a new wavelength path) is received by the new wavelength path receiving unit 232. In operation S802, the monitoring wavelength path selecting unit 234 selects a monitoring target wavelength path based on the received information. In operation S803, the new wavelength path noise limit calculating unit 233 calculates the noise limit amount of the new wavelength path. In operation S804, the monitoring wavelength path noise limit calculating unit 235 calculates the noise limit amount of the monitoring target wavelength path. In operation S805, the wavelength path adding unit 236 increases the path power of the wavelength path N. While increasing the power of the wavelength path N, the wavelength path adding unit 236 checks whether or not the amount of noise in the monitoring target wavelength path exceeds the noise limit amount. Further, the wavelength path adding unit 236 may check whether or not the amount of noise in the wavelength path N exceeds the noise limit amount.

The operations S801 to S805 of the process performed by the control device 110 when setting the wavelength path N are not limited to the order illustrated in FIG. 8A. For example, the operation S803 may be executed any time after the execution of the operation S801 and before the execution of the operation S805. Similarly, the operation 804 may be executed any time after the execution of the operation S802 and before the execution of the operation S805.

Figure 8B:
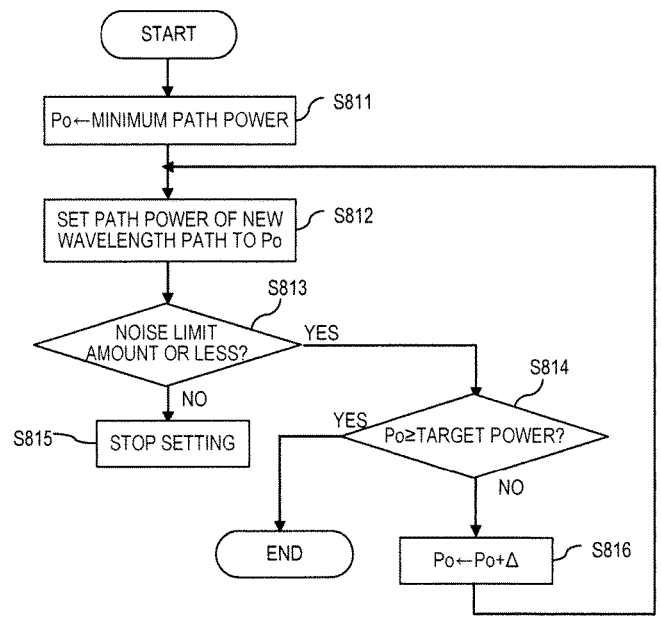
FIG. 8B is another flow chart of a process for setting a new wavelength path.

FIG. 8B is a flow chart of a process performed by the wavelength path adding unit 236 for increasing the path power of the wavelength path N. In operation S811, a value of the minimum path power is substituted for a variable Po. The minimum path power is the smallest one among the path powers transmittable by the optical transmission repeater. At this time, it is not necessary to make an optical signal transmittable at the minimum path power. In operation S812, the wavelength path adding unit 236 sets the path power of the wavelength path N to a value of the variable "Po" in each transmitting-side node on the wavelength path N. In operation S813, the noise amount of each of the wavelength path N and the monitoring target wavelength path is measured, and it is determined whether or not the measured noise amount is equal to or less than the noise limit amount. When it is not equal to or less than the noise limit amount, the process proceeds to operation S815 in which the process of setting the wavelength path N is stopped.

When the noise amount of each of the wavelength path N and the monitoring target wavelength path is measured, and it is determined in the operation S813 that the measured noise amount is equal to or less than the noise limit amount, the process proceeds to operation S814 in which it is determined whether or not the value of the variable Po is equal to or greater than the target power. When the value of the variable Po is equal to the target power, the wavelength path adding unit 236 ends the process.

When it is determined in the operation S814 that the value of the variable Po is not equal to the target power, the process proceeds to operation S816 in which the value of the variable Po is increased by a value of A, and then the process returns to the operation S812.

In addition, in the operation S813, the noise amount of each of the wavelength path N and the monitoring target wavelength path is measured, and it is checked that the measured noise amount is equal to or less than the noise limit amount. However, measurement of the noise amount of the wavelength path N and checking on whether or not the measured noise amount is equal to or less than the noise limit amount may not be performed until the path power of the wavelength path N reaches a predetermined value (for example, path power (optical power allowing minimum optical power transmission) (minimum allowable path power)). The reason for this is that when the path power of the wavelength path N is small and is less than the path power allowing optical transmission, it is almost normal that a lot of noise is detected. Therefore, there is a possibility of branching to NO from the operation S814 due to the wavelength path N, which may make it impossible to set the wavelength path N.

Therefore, as illustrated in FIG. 9, as long as the path power of the wavelength path N is less than the minimum allowable path power (−3 dBm/ch in the case of FIG. 9) allowing optical transmission, measurement of the amount of noise for the wavelength path N may not be performed. Therefore, checking on whether or not the amount of noise is less than the noise limit amount may not be performed. In FIG. 9, "N/A" in the column of "New wavelength path" indicates that measurement and check of the noise amount have not been performed for the wavelength path N. Then, when the path power of the wavelength path N is equal to or more than the minimum allowable path power allowing optical transmission, the amount of noise on the wavelength path N is measured, and it is checked that the measured noise amount is equal to or less than the noise limit amount. In FIG. 9, "OK" in the column of "New wavelength path" indicates that the amount of noise on the wavelength path N is measured when the path power of the wavelength path N is −3 dBm/ch, and the measured noise amount is equal to or less than the noise limit amount.

In this manner, by not performing measurement of the noise amount of the wavelength path N while the path power of the wavelength path N is less than the predetermined value, it is possible to reduce the possibility of failure in setting the wavelength path N and lessen the labor required for noise measurement and the like.

Further, in FIG. 8B, the value of Δ may be a variable value rather than a constant. This is because, when the amount of noise is measured for at least two different values with respect to the path power of the wavelength path N for an established wavelength path, the amount of noise may be predicted when the path power of the wavelength path N is increased by extrapolation (interpolation) of the amount of noise.

Figure 10:
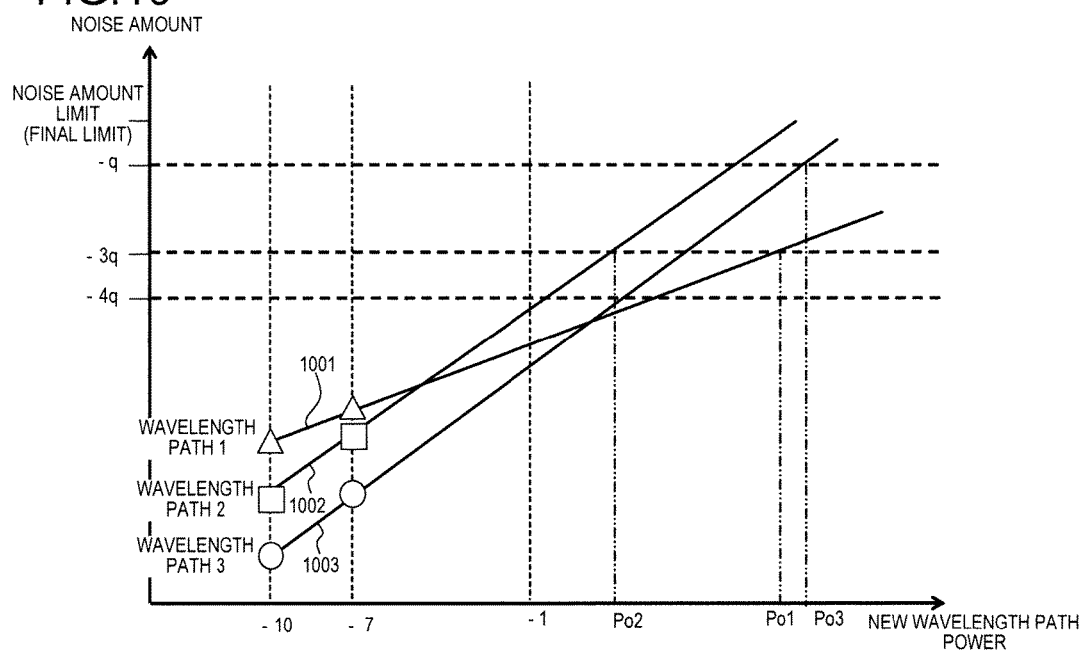
FIG. 10 is a view illustrating an example of a graph for predicting an effect on an established wavelength path as the path power of a new wavelength path increases.

Specifically, as indicated by the measurement points Δ, □ and ○ in FIG. 10, it is assumed that the amount of noise of the wavelength paths 1 to 3 is measured when the path power of a new wavelength path is −10 dBm/ch and −7 dBm/ch. Then, it is possible to predict the amount of noise when the path power of the wavelength path N is further increased for example by straight lines 1001, 1002, and 1003 obtained by extrapolation in the two cases.

Figure 11:
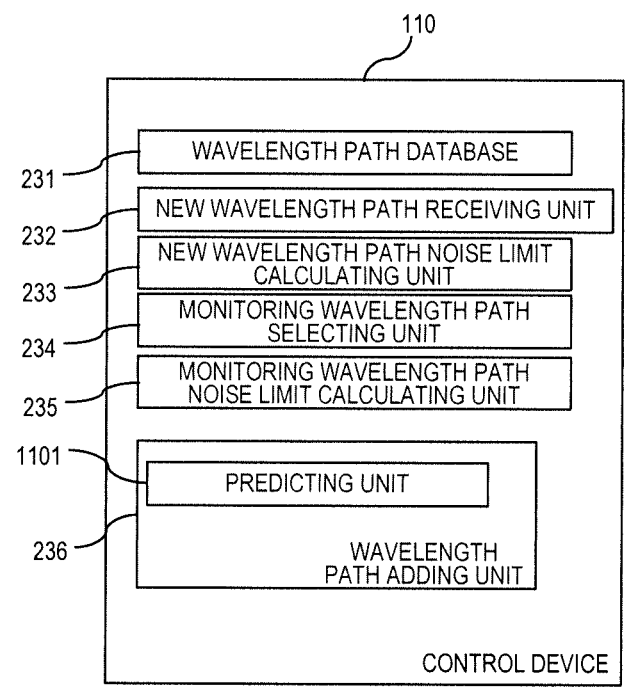
FIG. 11 is a functional block diagram of a control device of an optical transmission system according to a modification of the first embodiment.

FIG. 11 is a functional block diagram of the control device 110 in a case where such noise amount prediction is performed. Similarly to FIG. 2, the control device 110 includes a wavelength path database 231, a new wavelength path receiving unit 232, a new wavelength path noise limit calculating unit 233, a monitoring wavelength path selecting unit 234, a monitoring wavelength path noise limit calcu-lating unit 235, and a wavelength path adding unit 236. The wavelength path adding unit 236 has a predicting unit 1101.

The predicting unit 1101 predicts the amount of noise when the new wavelength path power is further increased in a case where the amount of noise for at least two new wavelength path powers is measured for an established wavelength path. For example, the prediction is performed by extrapolating (interpolating) the amount of noise for at least two new wavelength path powers.

As illustrated in FIG. 10, when the straight line 1001 indicates the noise limit amount of the wavelength path 1, the path power is obtained as $P_{o1}$. Similarly, when the straight line 1002 indicates the noise limit amount of the wavelength path 2, the path power is obtained as $P_{o2}$, and when the straight line 1003 indicates the noise limit amount of the wavelength path 3, the path power is obtained as $P_{o3}$. At this time, when $P_{o2} < P_{o1} < P_{o3}$, the wavelength path 2 reaches the noise limit amount by the smallest path power.

Therefore, when it is checked that the noise amount of the wavelength paths 1 to 3 is equal to or less than the noise amount limit with the path power of the wavelength path N set to −7 dBm/ch, Po may be set to a value between −7 and $P_{o2}$ in the operation S816. More specifically, in the operation S816, $\Delta = (-7 + P_{o2})/2 - (-7)$ and $Po = (-7 + P_{o2})/2$.

Figure 12:
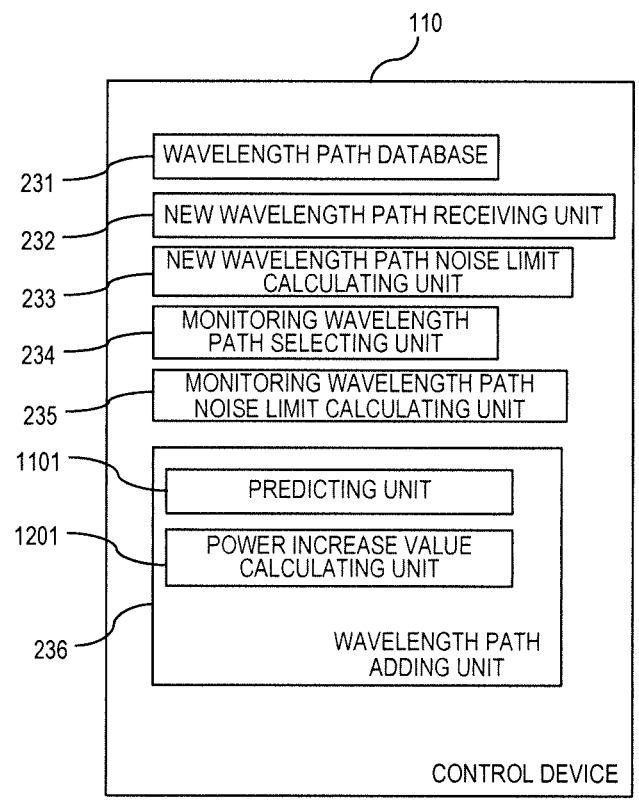
FIG. 12 is a functional block diagram of a control device of an optical transmission system according to a modification of the first embodiment.

FIG. 12 is a functional block diagram of the control device 110 in a case where the increase value Δ of the path power of a new wavelength path is calculated based on the path power of the new wavelength path having the noise amount already measured and the prediction by the predicting unit 1101 in the operation S816. Similarly to FIG. 2, the control device 110 includes a wavelength path database 231, a new wavelength path receiving unit 232, a new wavelength path noise limit calculating unit 233, a monitoring wavelength path selecting unit 234, a monitoring wavelength path noise limit calculating unit 235, and a wavelength path adding unit 236. The wavelength path adding unit 236 includes a predicting unit 1101 and a power increase value calculating unit 1201.

The power increase value calculating unit 1201 calculates an increase value of the path power of a new wavelength path based on the path power of the new wavelength path having the noise amount already measured and the prediction by the predicting unit 1101.

By thus increasing the path power of the wavelength path N, it is possible to set the wavelength path N more quickly.

As described above, in the present embodiment, when a new wavelength path is set, a monitoring target wavelength path which is likely to be affected by the setting of the wavelength path is selected, and the noise limit amount of the monitoring target wavelength path is calculated. This makes it possible to prevent optical transmission of an established wavelength path from being impossible when trying to set the new wavelength path. In addition, by increasing the path power of the new wavelength path one step at a time, it is possible to prevent the optical transmission of the established wavelength path from being suddenly impossible.

Second Embodiment

In the first embodiment, the path powers of all the transmission side nodes on the newly set wavelength path are increased. As a result, the path powers may be equalized in different spans. Meanwhile, in a case where the transmission characteristics are different for different spans or the use rates of wavelength paths are different for different spans, it is desirable that the path powers are different for different spans.

Therefore, as a second embodiment, a mode of dividing a newly set wavelength path into a plurality of segments, setting a target power and increasing a path power will be described. The segment used herein refers to a sub-path of the wavelength path. For example, in a sub path having a high use rate of a wavelength path (a congested sub path), a wavelength path is set for each span of the sub path, and in a non-congested sub path, one wavelength path is set over a plurality of spans of the sub path.

Figure 13:
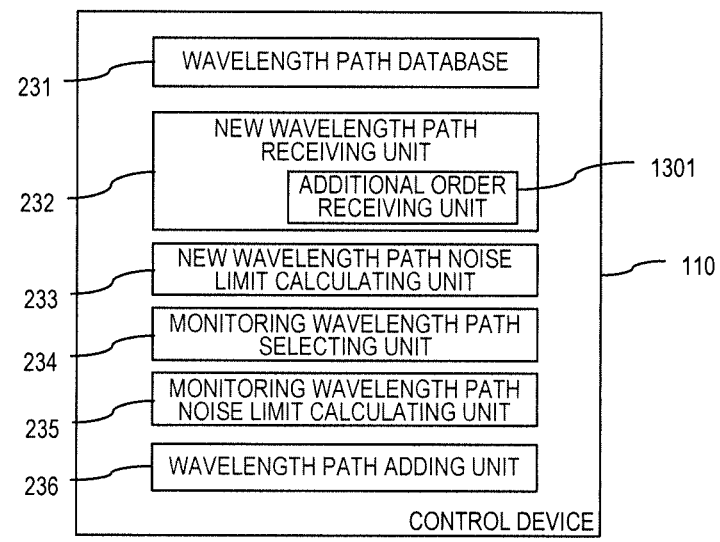
FIG. 13 is a functional block diagram of a control device of an optical transmission system according to a second embodiment.

FIG. 13 is a functional block diagram of the control device 110 of the optical transmission system 100 according to the second embodiment. In the control device 110 of the optical transmission system 100 according to the second embodiment, the new wavelength path reception unit 232 of the control device 110 of the optical transmission system according to the first embodiment illustrated in FIG. 2 further has an additional order receiving unit 1301.

The additional order receiving unit 1301 receives a plurality of segments of a newly set wavelength path. In a case where a route of the newly set wavelength path is, for example, "A, B, D, E," the additional order receiving unit 1301 may receive the segments "A, B, D" and "D, E." In this case, after setting a wavelength path (hereinafter referred to as a wavelength path N1) in "A, B, D," the control device 110 sets a wavelength path (hereinafter referred to as a wavelength path N2) in "D, E."

Figure 14:
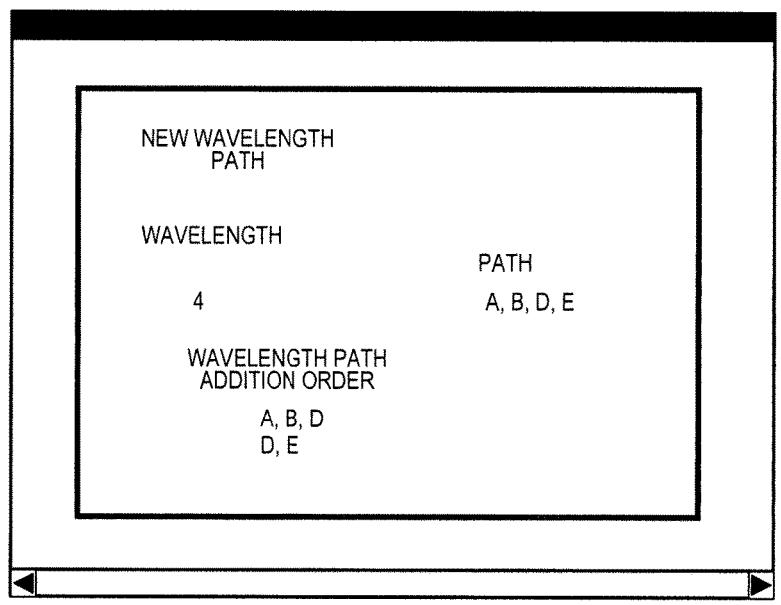
FIG. 14 is a view illustrating an example of screen display for adding a new wavelength path in the second embodiment.

FIG. 14 illustrates an example of a state in which information on a newly set wavelength path is received, together with an addition order, by the new wavelength path receiving unit 232 and is displayed on the display in the present embodiment. The present embodiment is different from the first embodiment in that a wavelength path addition order is displayed.

In the case of FIG. 14, the wavelength path addition order is "A, B, D" and "D, E." As described above, the control device 110 adds the wavelength path in two steps. First, the wavelength path N1 of a wavelength 4 may be set in to A, B and D, and then, the wavelength path N2 of the wavelength 4 may be set in D and E.

In other words, first, in order to newly set the wavelength path N1 in the segments A, B and D, the noise limit amount of the newly set wavelength path is obtained. The noise limit amount is calculated based on $V_{N1}+S_{Rest}$ and is equal to a value obtained by subtracting a value obtained by multiplying $V_{N1}+S_{Rest}$ by q from the noise amount limit (final value). Here, $S_{Rest}$ is the total sum of the number of wavelength paths obtained for each span, which cause deterioration of communication quality of the wavelength path N2 by setting the wavelength path N2 in the wavelength path of the unset segment $R_{est}$. In general, $S_{N2}$ is twice the number of spans of N2, but when the center wavelength of an optical signal is the minimum wavelength or the maximum wavelength in each span, $S_{N2}$ is equal to the number of spans. Therefore, the noise limit amount of the wavelength path N1 is calculated based on $V_{N1}+S_{N2}$.

The reason why $S_{Rest}$ is added to $V_{N1}$ is that, since the wavelength path is set in Rest after setting N1, it is necessary to add an effect from other wavelength paths in advance when setting the wavelength path in Rest.

Since the wavelength path N1 is set in the segment of A, B and D, Rest becomes the segment of D and E. Therefore, since $V_{N1}=V_{N1,A \to B}+V_{N1,B \to D}=0+1$ and $S_{Rest}=2\times1=2$, the noise limit amount of the wavelength path N1 is a value obtained by subtracting 3×q from the noise limit amount (final limit).

The monitoring target wavelength path is the wavelength path 1 and the wavelength path 2. $V_{wavelength\ path\ 1}=4$ and $V_{wavelength\ path\ 2}=3$. The reason why the wavelength path 1 is larger by 1 than that in the first embodiment is that the wavelength path N2 is not set in the spans of D and E even when the wavelength path N1 is set.

To summarize the above, the noise limit amount of the wavelength path N1 is a value obtained by subtracting 3×q from the noise amount limit (final value), and the noise limit amount of the wavelength path 1 is a value obtained by subtracting 4×q from the noise amount limit (final value). Further, the noise limit amount of the wavelength path 2 is a value obtained by subtracting 3×q from the noise amount limit (final value).

Figure 15:
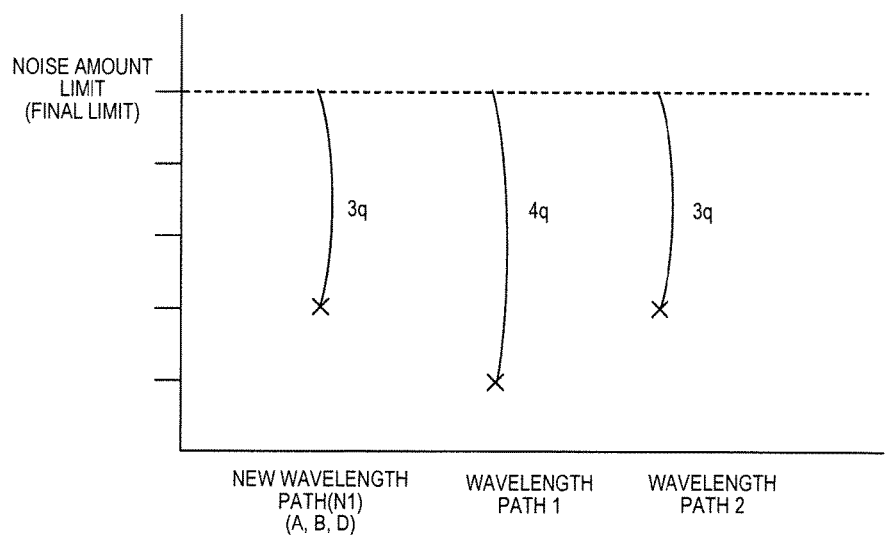
FIG. 15 is a view illustrating an example of calculation of a noise limit amount after adding a new wavelength path.

FIG. 15 is a graph illustrating the noise limit amount of each wavelength path. It is illustrated in the graph that the noise limit amount of the wavelength path N1 is a value obtained by subtracting 3×q from the noise amount limit (final limit). It is illustrated in the graph that the noise limit amount of the wavelength path 1 is a value obtained by subtracting 4×q from the noise amount limit (final limit). It is illustrated in the graph that the noise limit amount of the wavelength path 2 is a value obtained by subtracting 3×q from the noise amount limit (final limit).

When the setting of the wavelength path N1 is completed, the control device 110 sets the wavelength path N2. The noise limit amount is calculated by the same calculation as above. When setting the wavelength path N2, since there is no unset segment Rest, the noise limit amount is a value obtained by subtracting a value obtained by multiplying $V_{N1}$ by q from the noise amount limit (final value). In addition, the monitoring target wavelength path are the wavelength path 1 and the wavelength path 3 whose noise limit amounts are respectively values obtained by subtracting 3×q and q from the noise amount limit (final limit).

Figure 16:
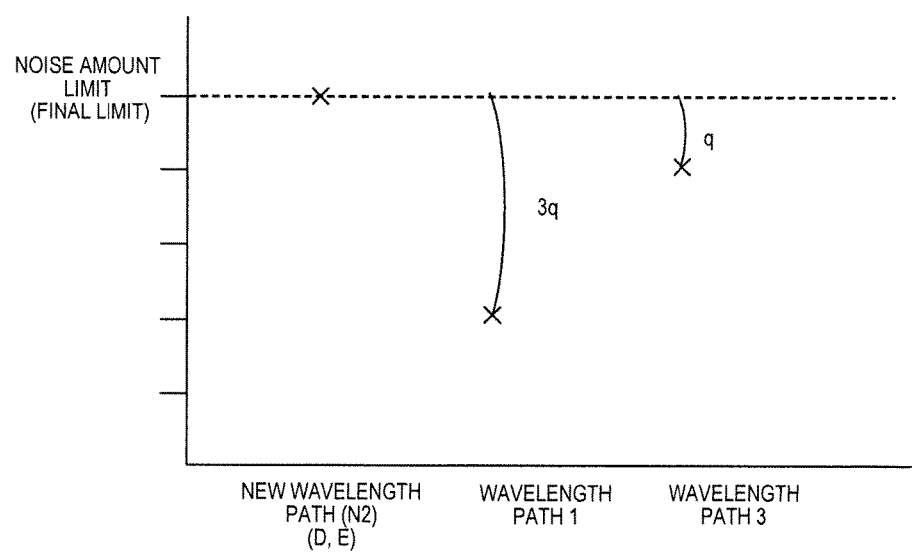
FIG. 16 is a view illustrating an example of calculation of a noise limit amount after adding a new wavelength path.

FIG. 16 is a graph illustrating the noise limit amount of each wavelength path. It is illustrated in the graph that the noise limit amount of the wavelength path N2 is equal to the noise amount limit (final value). It is illustrated in the graph that the noise limit amount of the wavelength path 1 is a value obtained by subtracting 3×q from the noise amount limit (final limit). It is illustrated in the graph that the noise limit amount of the wavelength path 3 is a value obtained by subtracting q from the noise amount limit (final limit).

Comparing FIG. 15 with FIG. 16, when dividing the newly set wavelength path into a plurality of segments, the noise limit amounts of the wavelength paths are not equal to each other each time a wavelength path is set in a segment. Therefore, it is preferable to set target powers to be different from each other according to their respective segments.

Third Embodiment

Figure 17:
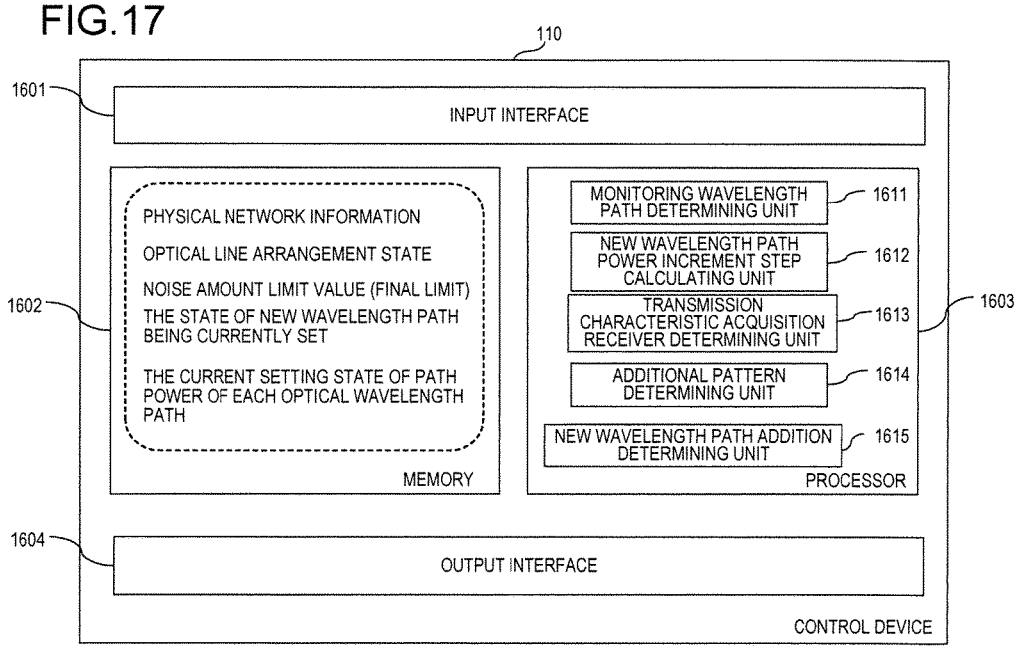
FIG. 17 is a functional block diagram of a control device according to a third embodiment.

FIG. 17 is a functional block diagram of the control device 110 when viewed from a different side. The control device 110 includes an input unit (input interface) 1601, a storage unit (memory) 1602, a calculating unit (processor) 1603, and an output unit (output interface) 1604.

Information on a wavelength path to be newly set and information on transmission characteristics (noise amount) acquired from a receiver installed in each node are input to the input unit 1601. Therefore, the input unit 1601 includes the function of the new wavelength path receiving unit 232 illustrated in FIG. 2.

The storage unit 1602 stores physical network information, an optical line arrangement state, a noise amount limit value (final limit), the state of a new wavelength path being currently set, and the current setting state of the path power of each wavelength path. Therefore, the storage unit 1602 includes the function of the wavelength path database 231. In addition, during the setting of the wavelength path, the storage unit 1602 stores information corresponding to the table illustrated in FIG. 9.

The calculating unit 1603 includes a monitoring wavelength path determining unit 1611, a new wavelength path power increment step calculating unit 1612, a transmission characteristic acquisition receiver determining unit 1613, an additional pattern determining unit 1614, and a new wavelength path addition determining unit 1615.

The monitoring wavelength path determining unit 1611 corresponds to the monitoring wavelength path selecting unit 234 and determines a monitoring target wavelength path when information of a new wavelength path is input thereto.

The new wavelength path power increment step calculating unit 1612 corresponds to the power increase value calculating unit 1201 and determines a value of Δ in the operation S816 of the flowchart of FIG. 8B.

The transmission characteristic acquisition receiver determining unit 1613 selects a receiver that acquires the noise amount in order to check that it is equal to or less than the noise limit amount in operation S814.

The additional pattern determining unit 1614 determines whether to divide a new wavelength path into a plurality of segments when setting a new wavelength path. In the second embodiment, it is possible to determine whether to divide a new wavelength path by designating the wavelength path addition order when inputting the information of the new wavelength path. Meanwhile, in the third embodiment, even when a wavelength path addition order is not designated, the control device 110 determines whether or not a sub path is congested, based on the topology of node connection and the number of wavelength path settings, to decide a wavelength path addition order. When the additional pattern determining unit 1614 decides to designate the wavelength path addition order to set a wavelength path, the wavelength path adding unit 236 performs a control so as to perform the process of the second embodiment.

Whether or not the sub path is congested may be determined by determining whether or not the number of wavelength paths set in the sub path is equal to or greater than a predetermined constant M. In other words, when the number of wavelength paths set in the sub route is equal to or greater than the constant M, it is determined that the sub path is congested. Meanwhile, when the number of wavelength paths set in the sub path is smaller than the constant M, it is determined that the sub path is not congested.

The new wavelength path addition determining unit 1615 makes the determination in the operation S813 of the flowchart in FIG. 8B.

Therefore, the new wavelength path power increment step calculating unit 1612, the transmission characteristic acquisition receiver determining unit 1613, the additional pattern determining unit 1614, and the new wavelength path addition determining unit 1615 are included in the function of the wavelength path adding unit 236.

(Applications)

The optical transmission system 100 including the above-described control device 110 may perform an optical path defragmenting process.

FIG. 18A illustrates a result of repetition of addition and deletion of wavelength paths between nodes 1701 and 1702, illustrating an unused wavelength band between a wavelength path C1 and a wavelength path C2. In addition, the wavelength path C2 is adjacent to the wavelength path C1.

Therefore, in order that the optical transmission system 100 having the above-described control device 110 effectively utilizes a wavelength band, a wavelength band of the wavelength path C2 may be moved to the wavelength band between the wavelength path C1 and the wavelength path C2, as illustrated in FIG. 18B.

In this case, when setting the wavelength path C2 by moving it between the wavelength paths C1 and C3, by increasing the path power one step at a time, it is possible to detect that a transmission margin of the wavelength path C1 or C3 is equal to or less than a certain value, for example by crosstalk. The detection in this case may be achieved without making transmission of the wavelength paths C1 and C3 impossible. In addition, even when the transmission margin of C2 after setting may not be obtained sufficiently, it is possible to achieve such detection in the same way.

Figures 19A, 19B:
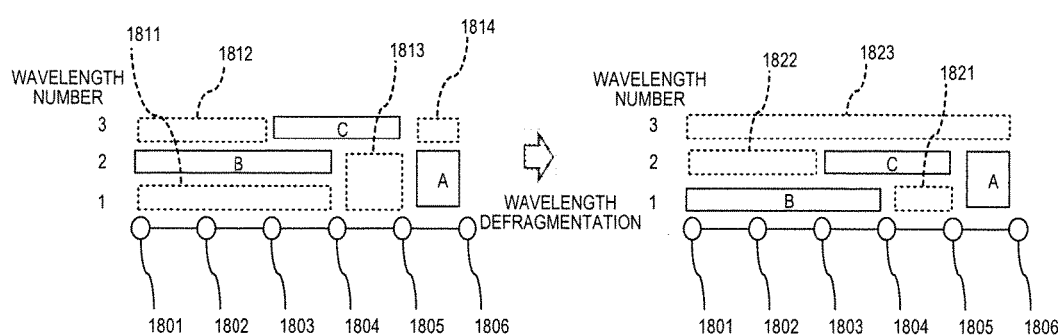
FIGS. 19A and 19B are views illustrating an example of wavelength defragmentation.

FIGS. 19A and 19B are views illustrating a more generalized example of fragmentation by wavelength. As illustrated in FIG. 19A, a wavelength path A is set in nodes 1805 and 1806 using wavelengths 1 and 2, and a wavelength path B is set in nodes 1801 to 1804 using the wavelength 2. Further, it is assumed that a wavelength path C is set in the nodes 1803 to 1805 using a wavelength 3. Further, it is assumed that no wavelength path is set in reference numerals 1811 to 1814.

Such a situation may be caused by repeating setting/canceling a wavelength path of an optical network dynamically, for example, by introduction of the SDN.

In the case of FIG. 19A, a wavelength path may not be newly set between the nodes 1801 to 1806.

However, by performing the wavelength defragmentation, as illustrated in FIG. 19B, a portion where no wavelength path is set occurs as denoted by reference numerals 1821 to 1823. For example, a wavelength path using the wavelength 3 may be set in the nodes 1801 to 1806, as denoted by reference numeral 1823, thereby making it possible to effectively utilize a wavelength space.

As described above, according to the present disclosure, it is possible to set a new wavelength path in appropriate consideration of the effect of transmission characteristics on other wavelength paths in a network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device for controlling a first transmission device and a second transmission device, the control device comprising:
 a memory; and
 a processor coupled to the memory, the processor configured to:
  set a first wavelength path between the first transmission device and the second transmission device;
  select a monitoring wavelength path for a monitoring wavelength from established wavelength paths allocated on a transmission line between the first transmission device and the second transmission device; and subtract a consideration value from a lower limit value of a signal quality of the monitoring wavelength path such that an allowable lower limit value of the signal quality of the monitoring wavelength path is calculated, thereby monitoring the signal quality of the monitoring wavelength path, the consideration value being obtained by multiplying a number of spans within the monitoring wavelength path to a noise increase amount of the monitoring wavelength caused by the first wavelength path; and increase power of the first wavelength path, based on the signal quality of the monitoring wavelength path.

2. The control device according to claim 1, wherein, in a case where the first wavelength path is allocated on the spans, the processor is configured to:

monitor the signal quality of the monitoring wavelength path for each of the spans, and increase the power of the first wavelength path, based on the signal quality of the monitoring wavelength path for each of the spans.

3. The control device according to claim 1, wherein the processor is configured to increase the power of the first wavelength path so that the signal quality of the monitoring wavelength path is equal to or higher than the lower limit value.

4. The control device according to claim 3, wherein, when the signal quality of the monitoring wavelength path is less than the allowable lower limit value, the processor is configured not to newly set the first wavelength path between the first transmission device and the second transmission device.

5. The control device according to claim 3, wherein the processor is configured to:

interpolate a plurality of signal qualities of the monitoring wavelength path for a plurality of values of the power of the first wavelength path, and predict the signal quality of the monitoring wavelength path when the power of the first wavelength path is further increased.

6. The control device according to claim 5, wherein the processor is configured to calculate a value to increase the power of the first wavelength path, based on the predicted signal quality of the monitoring wavelength path.

7. The control device according to claim 3, wherein, when a second wavelength path is set after setting the first wavelength path, the processor is configured to calculate the allowable lower limit value of the signal quality of the monitoring wavelength path, based on an amount of degradation of the signal quality of the monitoring wavelength path.

8. The control device according to claim 1, wherein a wavelength of the monitoring wavelength path is adjacent to a wavelength of the first wavelength path.

9. The control device according to claim 1, wherein the signal quality of the monitoring wavelength path is influenced by nonlinear effects caused by setting of the first wavelength path.

10. An optical transmission system comprising:

a first transmission device;

a second transmission device configured to communicate with the first transmission device through wavelength paths established on a transmission line; and a control device configured to control the first transmission device and the second transmission device, the control device including a memory and a processor coupled to the memory, wherein the processor is configured to:

set a first wavelength path between the first transmission device and the second transmission device, select a monitoring wavelength path for a monitoring wavelength from established wavelength paths allocated on the transmission line between the first transmission device and the second transmission device, subtract a consideration value from a lower limit value of a signal quality of the monitoring wavelength path such that an allowable lower limit value of the signal quality of the monitoring wavelength path is calculated, thereby monitoring the signal quality of the monitoring wavelength path, the consideration value being obtained by multiplying a number of spans within the monitoring wavelength path to a noise increase amount of the monitoring wavelength caused by the first wave length path, and increase power of the first wavelength path, based on the signal quality of the monitoring wavelength path.

11. The optical transmission system according to claim 10, wherein, in a case where the first wavelength path is allocated on the spans, the processor is configured to:

monitor the signal quality of the monitoring wavelength path for each of the spans; and increase the power of the first wavelength path, based on the signal quality of the monitoring wavelength path for each of the spans.

12. A method for controlling an optical transmission system, the optical transmission system including a first transmission device, a second transmission device configured to communicate with the first transmission device through wavelength paths established on a transmission line, and a control device configured to control the first transmission device and the second transmission device, the method comprising:

setting a first wavelength path between the first transmission device and the second transmission device;

selecting a monitoring wavelength path for a monitoring wavelength from established wavelength paths allocated on the transmission line between the first transmission device and the second transmission device;

subtracting a consideration value from a lower limit value of a signal quality of the monitoring wavelength path such that an allowable lower limit value of the signal quality of the monitoring wavelength path is calculated, thereby monitoring the signal quality of the monitoring wavelength path, the consideration value being obtained by multiplying a number of spans within the monitoring wavelength path to a noise increase amount of the monitoring wavelength caused by the first wave length path; and increasing power of the first wavelength path, based on the signal quality of the monitoring wavelength path, by a processor included in the control device.

13. The method according to claim 12, further comprising in a case where the first wavelength path is allocated on the spans, monitoring, by the processor, the signal quality of the monitoring wavelength path for each of the spans, and increasing, by the processor, the power of the first wavelength path, based on the signal quality of the monitoring wavelength path for each of the spans.

14. The method according to claim 12, further comprising:
    calculating the allowable lower limit value of the signal quality of the monitoring wavelength path, and
    increasing the power of the first wavelength path so that the signal quality of the monitoring wavelength path is equal to or higher than the allowable lower limit value.

15. The method according to claim 14, wherein, when the signal quality of the monitoring wavelength path is less than the allowable lower limit value, the first wavelength path is not newly set by the processor between the first transmission device and the second transmission device.

16. The method according to claim 14, further comprising:
    interpolating, by the processor, a plurality of signal qualities of the monitoring wavelength path for a plurality of values of the power of the first wavelength path; and
    predicting, by the processor, the signal quality of the monitoring wavelength path when the power of the first wavelength path is further increased.

17. The method according to claim 16, further comprising calculating, by the processor, a value to increase the power of the first wavelength path, based on the predicted signal quality of the monitoring wavelength path.

18. The method according to claim 14, further comprising, when a second wavelength path is set after setting the first wavelength path, calculating, by the processor, the allowable lower limit value of the signal quality of the monitoring wavelength path, based on an amount of degradation of the signal quality of the monitoring wavelength path.

19. The method according to claim 12, wherein a wavelength of the monitoring wavelength path is adjacent to a wavelength of the first wavelength path.

20. The method according to claim 12, wherein the signal quality of the monitoring wavelength path is influenced by nonlinear effects caused by setting of the first wavelength path.

* * * * *